(12) United States Patent
Wang

(10) Patent No.: US 8,761,122 B2
(45) Date of Patent: Jun. 24, 2014

(54) SIP—ENABLED FRAMEWORK FOR MULTI-DOMAIN ROAMING CONTROL PLANE IN A WIMAX ACCESS NETWORK

(71) Applicant: Apple, Inc., Cupertino (CA)

(72) Inventor: Guo Qiang Wang, Kanata (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/666,086

(22) Filed: Nov. 1, 2012

(65) Prior Publication Data

US 2013/0094473 A1  Apr. 18, 2013

Related U.S. Application Data

(63) Continuation of application No. 11/954,547, filed on Dec. 12, 2007, now Pat. No. 8,363,657.

(60) Provisional application No. 60/931,355, filed on May 23, 2007.

(51) Int. Cl.
*H04W 36/00* (2009.01)
(52) U.S. Cl.
USPC ........... 370/331; 370/332; 370/252; 370/312; 455/444; 455/445
(58) Field of Classification Search
USPC .............. 370/338, 395.1, 401, 466, 331–332; 455/432.1, 455, 574
See application file for complete search history.

(56) References Cited

U.S. PATENT DOCUMENTS

| | | | |
|---|---|---|---|
| 7,317,707 B2 | 1/2008 | Rajkumar et al. | |
| 7,453,831 B2 | 11/2008 | Dorenbosch et al. | |
| 7,852,809 B2 * | 12/2010 | Oberle et al. | 370/331 |
| 7,889,732 B2 | 2/2011 | Bijwaard et al. | |
| 8,050,233 B2 | 11/2011 | Gu et al. | |
| 8,170,560 B2 | 5/2012 | Wu | |

(Continued)

FOREIGN PATENT DOCUMENTS

| | | |
|---|---|---|
| CN | 1859775 A | 11/2006 |
| JP | 2004304386 | 10/2004 |
| WO | 2006/125085 A2 | 11/2006 |

OTHER PUBLICATIONS

Aricent, "Enabling Mobility in WiMAX Networks", Nov. 2006, p. 1-12.

(Continued)

*Primary Examiner* — Charles C Jiang
*Assistant Examiner* — Mohamed Kamara
(74) *Attorney, Agent, or Firm* — Meyertons, Hood, Kivlin, Kowert & Goetzel, P.C.

(57) ABSTRACT

Middleware is provided as a control plane for WiMAX control messaging. Each ASN in a WiMAX system is associated with a Session Initiation Protocol (SIP) server. A plurality of Functional Entities (FEs) are distributed across the ASNs, wherein each FE (or a group of FEs) associated with a SIP agent. Each FE is operable to control a function associated with a subscriber station (SS). The function controlled by a first FE is transferred to a second FE by employing the SIP agents to establish a SIP session between the first and second FEs. WiMAX control messages are then exchanged over the established session to transfer the SS function from the first FE to the second FE. The first and second FEs may be in the same ASN, or the first and second FEs may be in different ASNs.

24 Claims, 8 Drawing Sheets

(56) References Cited

U.S. PATENT DOCUMENTS

| | | | |
|---|---|---|---|
| 8,190,191 | B2 | 5/2012 | Livet et al. |
| 2005/0281208 | A1 | 12/2005 | Dorenbosch et al. |
| 2006/0126648 | A1* | 6/2006 | Park et al. .................. 370/401 |
| 2006/0270362 | A1 | 11/2006 | Emrich et al. |
| 2007/0091846 | A1 | 4/2007 | Kim et al. |
| 2007/0105600 | A1* | 5/2007 | Mohanty et al. ............. 455/574 |
| 2007/0140169 | A1* | 6/2007 | Rajagopalan ................ 370/331 |
| 2007/0173283 | A1 | 7/2007 | Livet et al. |
| 2007/0282990 | A1* | 12/2007 | Kumar et al. ................ 709/223 |
| 2008/0086564 | A1* | 4/2008 | Putman et al. ............... 709/227 |
| 2008/0227458 | A1 | 9/2008 | Wu |
| 2008/0229385 | A1 | 9/2008 | Feder et al. |
| 2008/0247342 | A1 | 10/2008 | Gugerell et al. |
| 2008/0298319 | A1 | 12/2008 | Lee et al. |
| 2009/0092099 | A1 | 4/2009 | Gu et al. |
| 2009/0135783 | A1 | 5/2009 | Khalil et al. |
| 2012/0329640 | A1* | 12/2012 | Bosnyak et al. ............. 502/100 |

OTHER PUBLICATIONS

Riegel, Max; "Mobile WiMAX Network Architecture"; Sep. 25, 2006; pp. 1-34.

Office Action in counterpart Chinese Application No. 200880025448.1, dated Nov. 23, 2011; 12 pages.

"Notification to Grant Patent Right for Invention" in counterpart Chinese patent application No. 200880025448.1, mailed May 9, 2012; 2 pages.

Japanese Intellectual Property Office. "Communication" for copending Japanese Application No. 2010-509568, mailed Sep. 13, 2012, pp. 1-3.

Japanese Intellectual Property Office, "Communication" for copending Japanese Application No. 2010-509568, mailed Sep. 13, 2012, 3 pages.

Riegel, "Mobile WiMAX Network Architecture", Sep. 25, 2006, 35 pages.

Aricent, white paper entitled "Enabling Mobility in WiMax Networks", Nov. 2006, 13 pages.

"Notification to Grant Patent Right for Invention" in counterpart Chinese Patent Application No. 200880025448, mailed May 9, 2012; 2 pages.

First Office Action in counterpart Chinese Patent Application No. 200880025448, dated Nov. 23, 2011; 12 pages.

Extended European Search Report in related Application No. 08769697.7-1853 / 2149228, Apr. 3, 2013, pp. 1-9.

Chiba et al.; "Mobility Management Schemes for Heterogeneity Support in Next Generation Wireless Networks;" IEEE 3rd Eurongi Conference on Next Generation Internet Networks, ISBN: 978-1-4244-0856-6, May 1, 2007; pp. 143-150.

Mosawi et al.; "A Novel Micro Mobility Solution Based on Media Independent Handover and SIP;" IEEE 64th Vehicular Technology Conference (VTC), Sep. 25-28, 2006, Montreal, Quebec, ISBN: 978-1-4244-0062-1; pp. 1-5.

* cited by examiner

SIP—ENABLED FRAMEWORK FOR MULTI-DOMAIN ROAMING CONTROL PLANE IN A WIMAX ACCESS NETWORK

PRIORITY CLAIM

This application is a continuation of U.S. patent application Ser. No. 11/954,547 entitled "SIP—Enabled Framework for Multi-Domain Roaming Control Plane in a WiMAX Access Network", to Wang, filed Dec. 12, 2007, which claims benefit to U.S. Provisional Patent Application Ser. No. 60/931,355 filed on May 23, 2007, both of which are hereby incorporated by reference in their entirety.

FIELD OF THE INVENTION

The present invention relates generally to the field of network access, and particularly to mobility and roaming in wireless networks.

BACKGROUND

In the past, mobile devices such as cell phones were limited to voice service and rudimentary data services. But mobile devices are quickly evolving into full fledged multimedia devices capable of voice service, e-mail service, text messaging, and even video-on-demand. New broadband network access services must be employed to provide the bandwidth and service quality required by these rapidly evolving services.

One such broadband network access service is referred to as "WiMAX". WiMAX is defined as Worldwide Interoperability for Microwave Access by the WiMAX Forum, formed in June 2001 to promote conformance and interoperability of the IEEE 802.16 standard, officially known as WirelessMAN.

The WiMAX Forum NWG (network working group) has defined a multi-domain mobility architecture including many functional entities (FEs) to support full mobility and multi-domain roaming within a WiMAX network. But the WiMAX NWG has not yet defined a solution for implementing the communications between FEs that must occur to implement full mobility. One current proposal suggests defining relay, routing, and session management at the FE functional layer. This means IP routing infrastructure and protocols must be reinvented at the application layer, so this is not a practical solution. Another proposal suggests implementing IP multicasting in all nodes. But the gateway and base station portions of an access service node in a WiMAX network are peripheral devices that do not typically implement IP transport functionality such as IP multicast. In order to require such would lead to significantly increased cost for these devices.

What is needed is a communication protocol for carrying WiMAX control plane traffic, which preferably provides a low-cost, scalable, interoperable and standard-compliant solution.

SUMMARY

In accordance with the principles of the invention, middleware is provided as a control plane for WiMAX control messaging. Accordingly, A WiMAX system includes a plurality of Access Service Networks (ASNs). Each ASN associated with a Session Initiation Protocol (SIP) server. A plurality of Functional Entities (FEs) are distributed across the ASNs, wherein each FE is associated with a WiMAX control function. Each FE is also associated with a SIP agent. Each FE is operable to control a function associated with a subscriber station (SS). The SS has a function controlled by a first FE. Logic for the transferring the SS function controlled by the first FE to a second FE includes: logic employed by the SIP server associated with the ASN associated with the first FE, and by the SIP server associated with the ASN associated with the second FE, and by the SIP agents in the first and second FEs for establishing a SIP session between the first and second FEs; and, logic for exchanging WiMAX control messages over the established session to transfer the SS function from the first FE to the second FE.

Furthermore, the invention is particularly applicable where the SS is a mobile SS. The first and second FEs may be in the same ASN—i.e. the SS mobility is intra-domain—or, the first and second FEs may be in different ASNs—i.e. the SS mobility is inter-domain.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION

Figure 1:
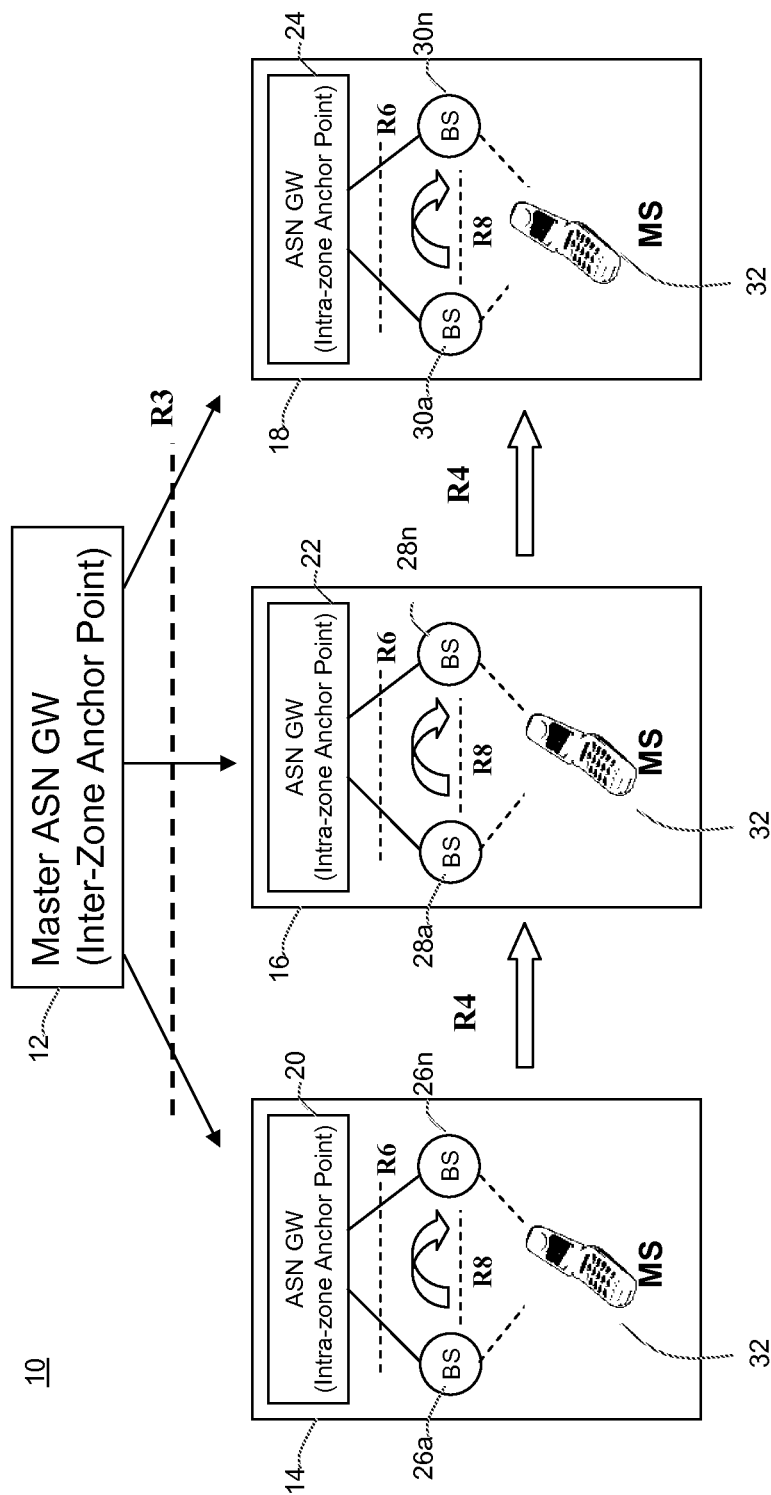
FIG. 1 is a representation of a multi-domain WiMAX network in which the invention can be employed.

In FIG. 1 there is shown an exemplary WiMAX network 10 in which the invention can be implemented. The network includes a master access services network (ASN) gateway 12, which could also be a customer service network (CSN), coupled to multiple access services networks (ASNs) 14, 16, 18, also referred to as "domains". Each ASN 14, 16, 18 includes an ASN gateway 20, 22, 24. Multiple base stations (BS) 226a . . . n, 28a . . . n, 30a . . . n are coupled to the respective ASN gateways 20, 22, 24. A mobile station (MS) 32, such as a cell phone in a car, or a laptop traveling on a train, etc., is coupled to a base station on an ASN, for example the base station 26a on the ASN 14. The base station 26a maintains the radio connectivity and data exchange operations between the MS 32 and the ASN 14. As the MS 32 moves, a hand-off of radio control operations may occur between the BS 26a and another BS 26 in the ASN 14. This may be a "fast handover" between BS, as shown by line R8, or it may be a handover involving the ASN gateway 20 via network R6. Depending on how long, or in what direction, the MS continues to move, a handoff may need to occur from a BS in one ASN to a BS in another ASN. For instance, a handover from the BS 26a to the BS 28a may occur involving the ASN gateway 20 and 22 over network R4. Also, a handoff may need to occur from a BS in one ASN to a BS in another ASN involving the master ASN gateway 12. For instance, a handover from the BS 26a to the BS 30a may occur involving the ASN gateway 20 and the master ASN gateway 12 over to the ASN gateway 24 to the BS 30a over network R3.

The WiMAX network described above is a "flat" network. That is, the network is non-hierarchical and all network entities are IP entities. But as can be seen, the control plane in the WiMAX network must be dynamically adjustable in order to accommodate mobile stations. That is, when the MS 32 moves from the ASN 14 domain to the ASN 18 domain, certain control functions must move with it. WiMAX defines control messages to be exchanged between the various control entities in the network to support continuous data connectivity for the MS 32, but WiMAX does not define the manner in which these control messages should be transferred between these entities. In accordance with the invention, there is provided middleware for establishing a control plane for the exchange of these control messages.

Figure 2:
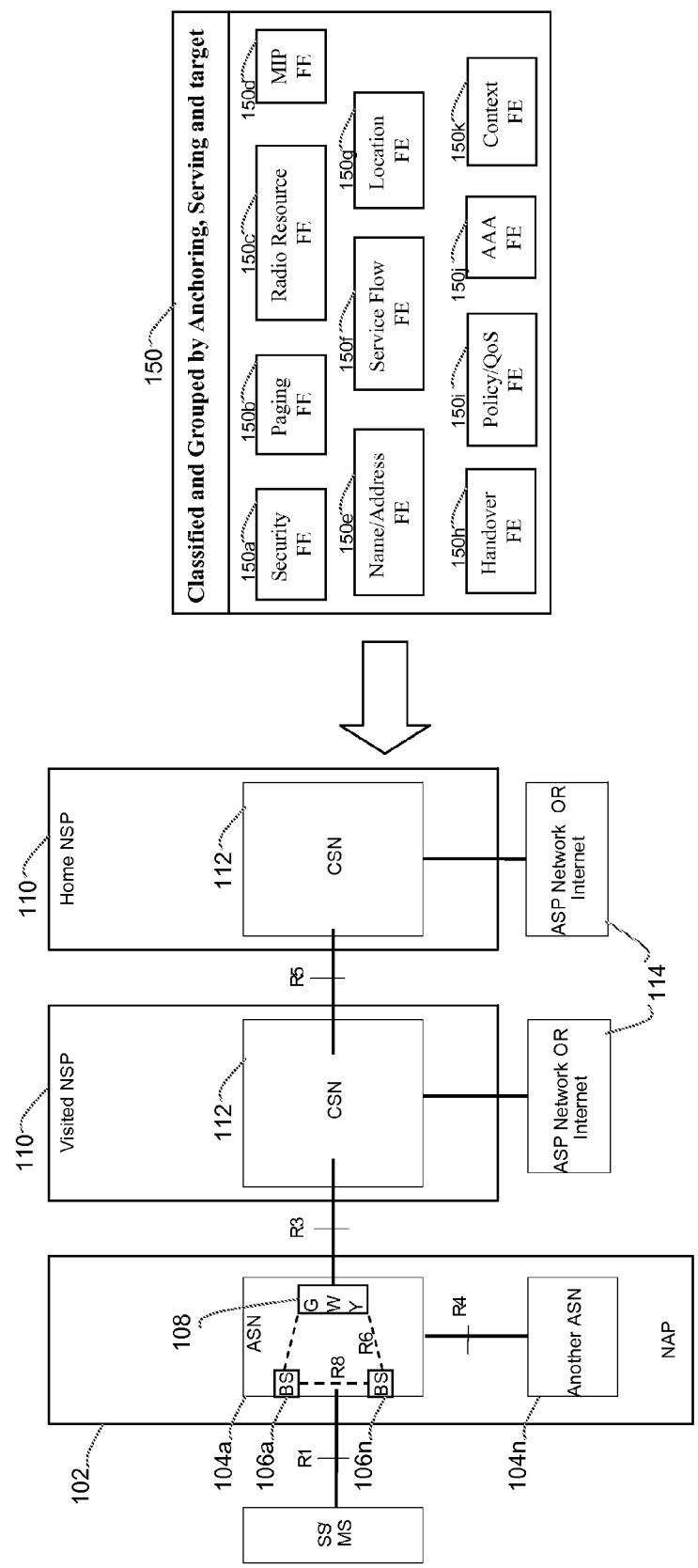
FIG. 2 is a reference model of a WiMAX network as defined by the WiMAX NWG.

In FIG. 2 there is shown a reference model of a WiMAX network 100 as defined by the WiMAX NWG. A WiMAX network 100 includes a NAP 102 having ASNs 104a ... 104n interfaced via an "R4" defined network interface. Each ASN 104a ... n includes BS 106a ... n coupled via defined network interface "R8". The BS are coupled to an ASN gateway 108 via defined network interface "R6". Each ASN 104 is coupled to a home network service point (NSP) 110 or a visited NSP 110. Each NSP includes a customer service network (CSN) 112. ASNs 104 are coupled to CSNs 112 via defined network interface "R3". CSNs 112 are coupled to each other via defined network interface "R5". CSNs may be further coupled to the Internet 114.

When the mobile station moves, it may move via a "fast hand-over" between BS 106 within a single ASN 104 via network interface "R8". Or, it may move "roam" between BS in a single ASN 104 via a radio control anchorpoint in an ASN gateway 108 via network interface "R6". Or, it may move via different ASNs 104, but still in the same CSN 112, via network interfaces "R4, R6". Or, it may move via different ASNs 104, via the CSN 112, via network interfaces "R3, R4, R6". Or, it may move to a different BS 106 on a different ASN on a different CSN, via network interfaces "R5, R3, R4, R6". The invention described herein operates on network interfaces R3, R4, R5, and R6.

Also shown in FIG. 2 are "Functional Entities" (FEs) 150. WiMAX FEs 150 are distributed amongst the various network elements (e.g. BS, ASN, ASN gateway, CSN) based on their role assignment (controller/agent, anchor/peer, serving/target) and location (intra-domain or inter-domain). Examples of FEs include security FE 150a, paging FE 150b, radio resource FE 150c, MIP FE 150d, Name/Address FE 150e, Service Flow FE 150f, Location FE 150g, Handover FE 150h, policy/QoS FE 150i, AAA FE 150j, and Context FE 150k.

Figure 3:
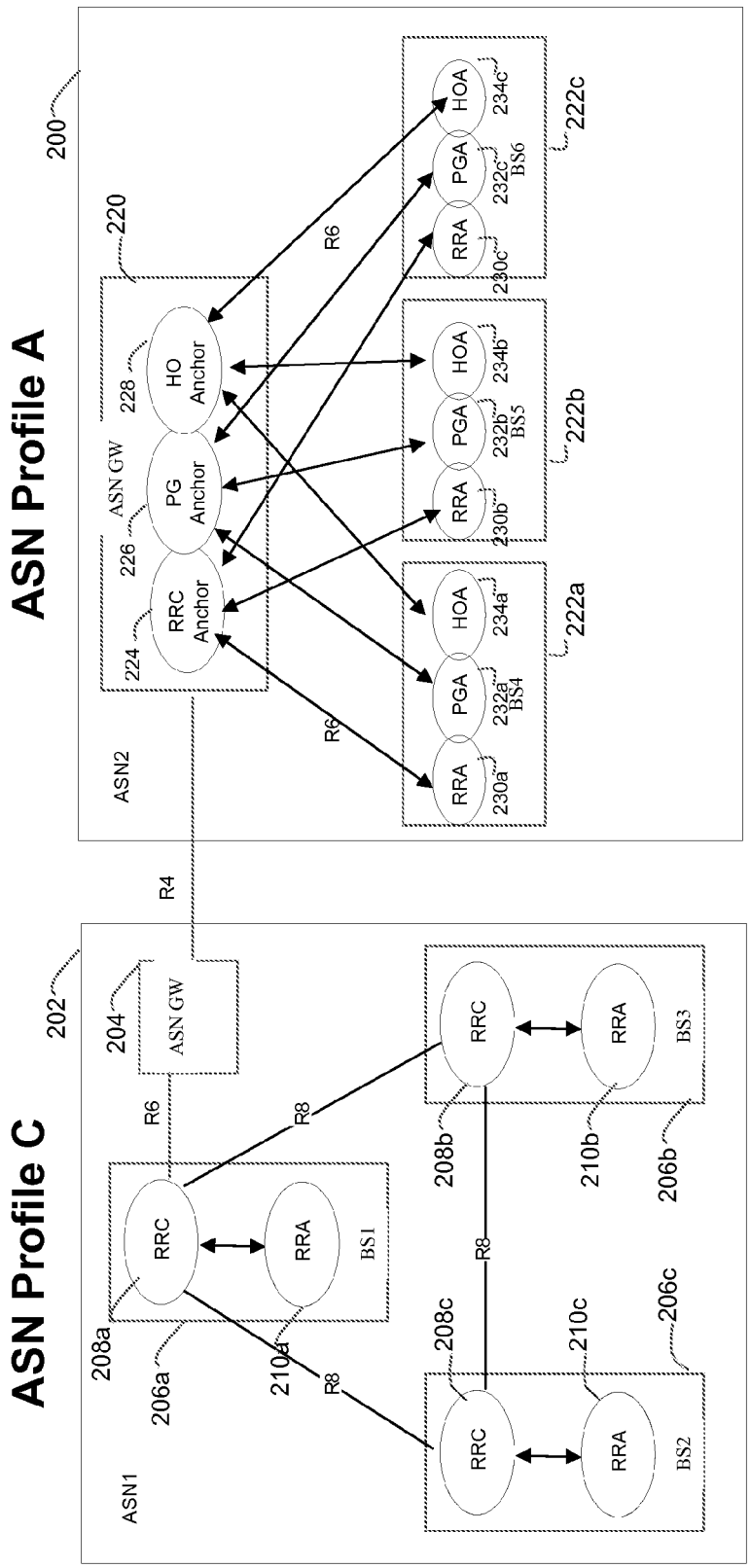
FIG. 3 shows two ASN profiles as defined by the WiMAX NWG.

Referring now to FIG. 3, there are shown ASN profiles as defined by the WiMAX specification, Profile A (200) and Profile C (202). The Profile C ASN 202 includes an ASN gateway 204 and three BS 206a, 206b, 206c. In Profile C, radio resource management is distributed. Each BS a, b, c includes all the FEs of a radio resource controller 208a, b, c and agent 210a, b, c respectively. This results in complexity of implementation, and thus expense, for the BS. But fast handovers can be performed between the BS when an MS roams between them. However, when an MS needs to roam to a BS attached to another ASN, the handover will involve the gateway 204.

The Profile A ASN 200 includes an ASN gateway 220 and three BS 222a, 222b, 222c. The ASN gateway 220 includes RRC (radio resource control) Anchor FE 224, PG (paging control) Anchor 226, and HO (handover) Anchor 228. The BS 222a includes a corresponding RRC agent 230a, a PG agent 232a, and an HO agent 234a. Likewise, the BS 222b includes a corresponding RRC agent 230b, a PG agent 232b, and an HO agent 234b. The BS 222c includes a corresponding RRC agent 230c, a PG agent 232c, and an HO agent 234c. This arrangement makes the BS easier and cheaper to implement and is adapted more easily to a multi-vendor environment. In this arrangement, when an MS roams between a BS in the ASN 200, it must do so via the ASN anchor gateway 220.

In the Profile A case, as a mobile station moves between intra-domain BS, control functions need to move with the mobile station to different FEs in the same ASN. In the Profile C case, as a mobile station moves between BS inter-domain, control functions need to move with the mobile station to different FEs in different ASN. In either case, the target FEs are non-deterministic due to the randomness of the mobile station's movement, and the movement may occur across multiple domains (i.e. ASNs). Thus, in accordance with the invention, there is provided a communication mechanism between FEs over which WiMAX control messages may be exchanged. It functions between inter- and intra-domain FEs. It is able to dynamically create sessions between FEs in order to respond to the non-deterministic motion of mobile stations. It provides multicast capability for paging, handover, and radio resource management, since multiple BS must be notified of the possible need to support an incoming mobile station. In accordance with advantages of the invention, the communication solution is a middleware solution that supports auto discovery, session management, and call relay. The middleware is scalable, standard-compliant, and infrastructure transparent.

Figure 4:
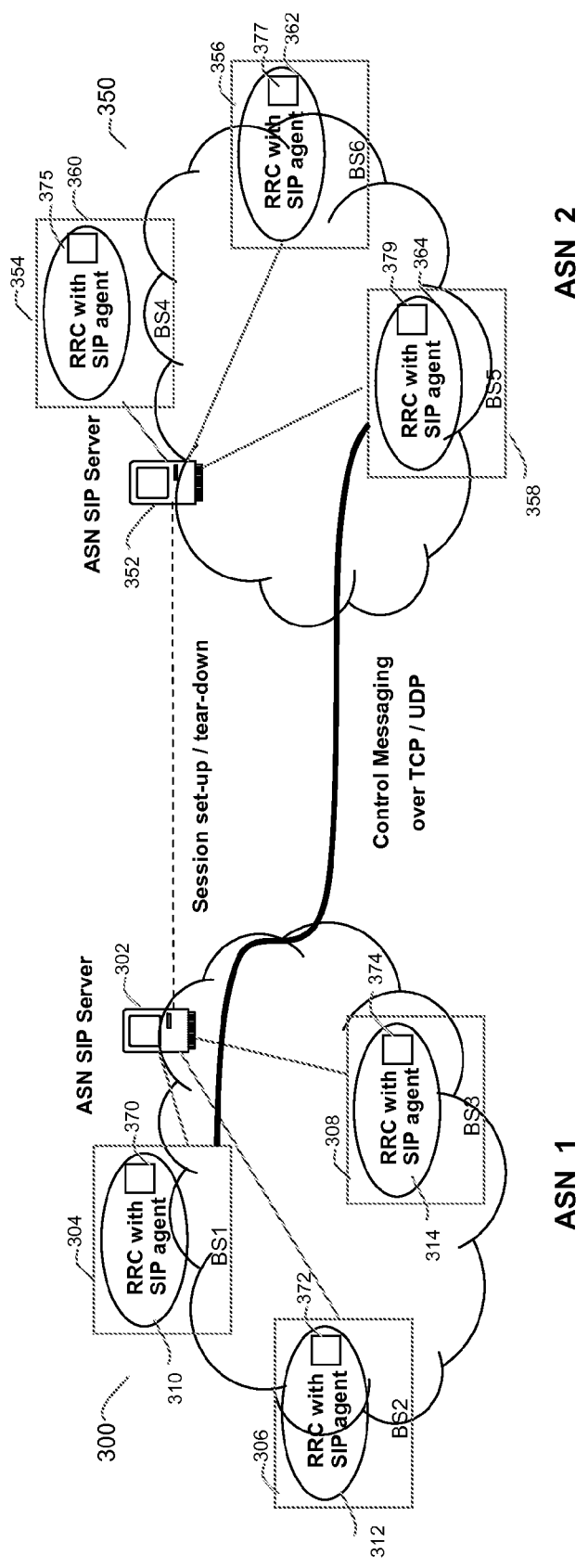
FIG. 4 is a representation of a multi-domain WiMAX network incorporating the invention.

Referring to FIG. 4, there is shown an embodiment of the invention. A Light-weight SIP protocol is used for session communication between FEs. Depicted are two ASNs, ASN 300 and ASN 350. ASN 300 includes a SIP server 302 and three BS, BS 304, 306, and 308. The BS 304 includes an FE or group of FEs, herein shown as an RRC, with a SIP agent (also known as a SIP client) 310. The BS 306 likewise includes an RRC with a SIP agent 312, and the BS 308 includes an RRC with a SIP agent 314. The SIP agents 310, 312, 314 communicate with the SIP server 302.

Likewise, ASN 350 includes a SIP server 352 and three BS, BS 354, 356, and 358. The BS 354 includes an FE or group of FEs, herein shown as an RRC, with a SIP agent 360. The BS 356 likewise includes an RRC with a SIP agent 362, and the BS 358 includes an RRC with a SIP agent 364. The SIP agents 360, 362, 364 communicate with the SIP server 352.

Interdomain, within ASN, SIP agents 310, 312, 314 register with the SIP server 302, or an auto-discovery algorithm is used by the SIP server 302 to identify agents coupled to it. Within ASN 350, SIP agents 360, 362, and 364 register with the SIP server 352 in the same manner. Intra-domain, ASN SIP servers 302 and 352 can set up and tear down SIP sessions between themselves.

Now an FE in one domain can exchange WiMAX control messages with an FE in another domain, for instance in anticipation of a roaming event. For example, the RRC 310 in the BS 304 in the ASN 300 can send WiMAX control messages to the RRC 364 in the BS 358 in the ASN 350, as shown via the heavy line from BS 304 to BS 358, by sending WiMAX control messages over a TCP/UDP connection between the IP RRCs. The WiMAX control messages are sent via a SIP session that has been set up between SIP agent 310, SIP server 302, SIP server 352, and SIP agent 358. When the RRCs 310 and 364 communication is complete, the SIP session can be torn down.

Generally, SIP is used to manage unicast and multicast sessions between FEs in order to provide a "control plane for the control plane". SIP sessions are set up and torn down between FEs as a mobile station moves. The SIP sessions serve as the control plane over which the FEs send their WiMAX control messages. Thus, control between FEs can be adjusted as the mobile station moves. Intra-domain, in a Profile C type or in a Profile A type ASN wherein Anchor FEs are used, control can be transferred from one FE in a BS to another FE in a BS over a TCP/UDP connection between the FEs over an R6 network interface. WiMAX control messages are relayed via SIP sessions maintained between the FEs and the SIP server. Inter-domain, an FE in one domain (ASN) can exchange WiMAX control messages with an FE in another domain (As shown in FIG. 4 via line from BS 302 to BS 358) by sending the control messages over a TCP/UDP connection over an R4 or R3 interface.

Light Weight SIP is a convenient protocol for use in that it is a standard compliant protocol; thus it offers ease of interoperability. SIP is implemented as middleware; thus, it is ASN infrastructure transparent. That is, the SIP sessions are agnostic to the underlying ASN access technology, be it IP, Ethernet, MPLS, etc.

In particular, in order to implement the invention, each FE (or FE group) is built with an embedded SIP agent (FIG. 4, RRCs with SIP agents 310, 312, 314, 360, 362, 364). A SIP proxy server is installed for each ASN control plane—i.e. for each domain. "Lightweight" SIP—that supporting text only, without support for multimedia streams—is sufficient for use for purposes of the invention. It will be helpful to extend SDP (IETF RFC 3312/3313) to include bandwidth, tunnel-end address, and tunnel ID for tunnel management (e.g., IP GRE, E-VLAN, MPLS PW). The FE (or FE group) registers to the SIP server with a URL address and an IP address. As shown in FIG. 4, each SIP agent has an API associated with it. APIs 370, 372, 374, 375, 377, and 379 are associated with SIP agents 310, 312, 314, 360, 362, 364 respectively. The APIs are provided by the SIP agents and used by FEs to communicate with each other. Each FE calls its SIP agent via its SIP agent's respective API. In turn, the SIP agents use a SIP stack to create, change, and maintain unicast or multicast point-to-point sessions dynamically. SIP multi-party sessions are used for multicasting control traffic to support anchoring functions such as paging and RRM spare capacity request. The session can be pre-configured or set up on demand. All WiMAX control messages can be implemented in the known manner using HTTP, Servlet, CGI, or SOAP over the sessions, and can be transmitted over TCP/UDP ports.

Figure 5:
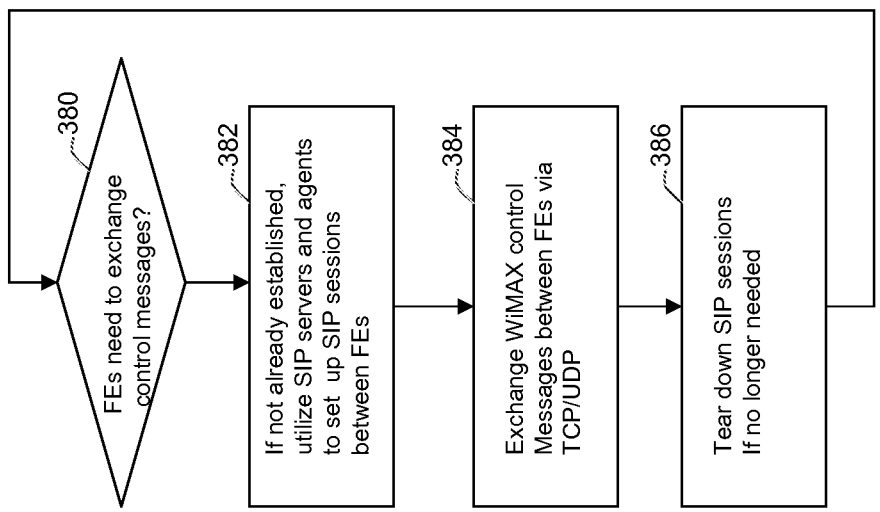
FIG. 5 is a flow diagram of the invention.

In FIG. 5 there is shown a flow diagram of the steps of the invention. It may be determined that FEs need to exchange WiMAX control messages—because an MS is moving and radio resources must be adjusted, or because an MS has moved while it was sleeping and must be located for data forwarding, etc. When control messages need to be exchanged between FEs, (step 380), the SIP servers and agents in the ASNs associated with the FEs establish SIP sessions (step 382). In some cases, these SIP sessions may already be established. In others, they may need to be established on demand. Once a SIP session is established between the FEs, the WiMAX control messages are exchanged via TCP or UDP messaging over IP (step 384). Once the message exchange is complete, the session may be torn down (step 386).

Figure 6:
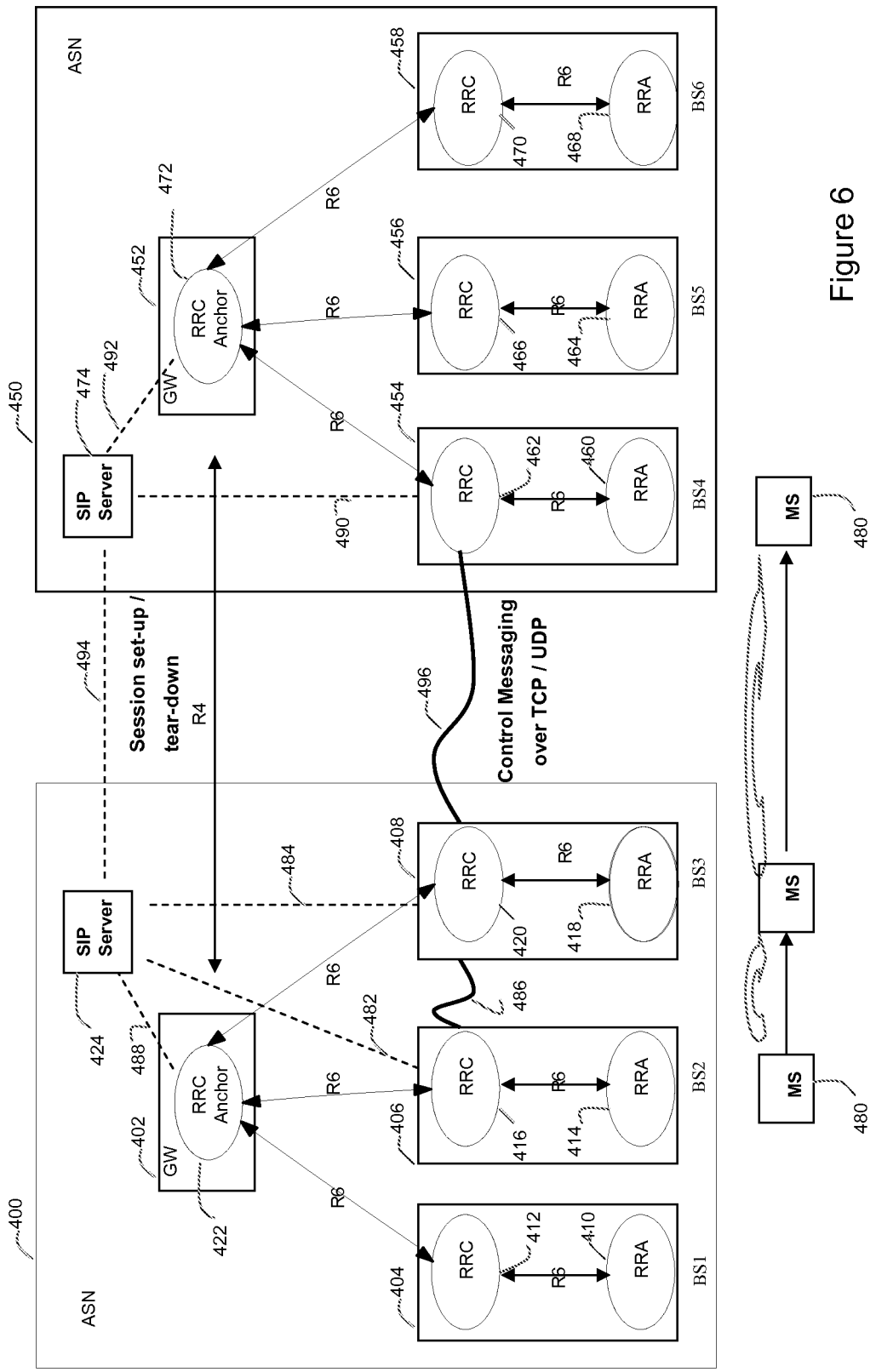
FIG. 6 is a representation of a first embodiment of the invention as embodied inter-domain and intra-domain, wherein an MS roams between BS.

Referring to FIG. 6, there is shown an example WiMAX network wherein SIP sessions are set up between FEs for WiMAX control message exchange. An ASN 400 and ASN 450 are shown. ASN 400 includes gateway (GW) 402 and BS 404, 406, and 408. BS 404 includes radio resource management agents and controllers 410, 412. Likewise, BS 406 includes radio resource management agents and controllers 414, 416, and BS 408 includes radio resource management agents and controllers 418, 420. The GW includes a radio resource control anchor 422, designated as anchor for inter-domain mobility. ASN 400 further includes SIP server 424. All of the FEs in the ASN 400, including the RRCs 416, 418, and 422, have registered their URLs and IP names with the SIP server 424.

ASN 450 is configured similarly to ASN 400. ASN 450 includes gateway (GW) 452 and BS 454, 456, and 458. BS 454 includes radio resource management agents and controllers 460, 462 Likewise, BS 456 includes radio resource management agents and controllers 464, 466, and BS 458 includes radio resource management agents and controllers 468, 470. The GW includes a radio resource control anchor 472, designated as anchor for inter-domain mobility. ASN 450 further includes SIP server 474. All of the FEs in the ASN 450, including the RRCs 466, 468, and 472, have registered their URLs and IP names with the SIP server 474.

An MS 480 is shown as its network connectivity moves from BS 406 to BS 408 in ASN 400, and then over to BS 454 in ASN 450. When the MS moves from BS 406 to BS 408, or when such a move is indicated or anticipated, a SIP session request is sent from RRC 416 to SIP server 424 via link 482, SIP server 424 then forwards it to RRC anchor 422 via link 488, thus a session is established between the RRC FE 416 in the BS 406 and the RRC anchor 422 in the ASN GW 402. Accordingly, a second SIP session is established between the RRC anchor 422 and the RRC FE 420 in the BS 408 via link 488 and 484, and a third SIP session is established between RRC 416 and RRC 420 via link 482 and 484. Once these SIP sessions are established among the various RRCs, they can exchange control messages for radio resource management. For example, after the SIP session between the RRC 416 and RRC 420 is established, WiMAX TCP/UDP control messages 486 are sent from the RRC 416 to the RRC 420, with the coordination from the RRC anchor 422 via the network interface R6 to ultimately switch radio resource control for the MS 480 to the BS 408.

When the MS moves from the BS 408 to the BS 454, WiMAX control messages are sent to transfer radio resource control from the RRC 420 in the BS 408 to the RRC 462 in the BS 454. In order to establish a control path for these messages, a SIP session 496 is established (if not already maintained) between the RRC FE 420 in the BS 408 located at ASN 400 and RRC 462 in the BS 454 located at ASN 450. The SIP signaling procedures involve RRC 420 as source entity, RRC 462 as destination entity, and SIP server 424 in ASN 400 and SIP server 474 in ASN 450 to relay the SIP messages, via the link 484 in ASN 400, the link 494 between SIP server 424 and 474, and the link 490 in ASN 450. In this manner, a control plane is established and maintained so that WiMAX control messages over session 496 can be sent via TCP/UDP from the RRC 420 in the BS 408 in the ASN 400 to the RRC 462 in the BS 454 in the ASN 450 with the coordination of the RRC anchors 422, 472 via the network interface R4.

Meanwhile, as the MS 480 moves across domains, the RRC anchor 422 sends WiMAX control messages containing MS 480 information to the neighboring ASN 450, and sends WiMAX control messages inquiring of the neighboring ASN 450's radio channel availability via the R4 network interface. These WiMAX control messages are sent via the SIP session that is maintained between the RRC anchor 422 and the RRC anchor 472 in the GW 452. One such message may be an "RRM spare capacity request" message. This is a multicast message that addresses many BS to see which BS are available to service an incoming MS. In order to transport this message, a multi-party SIP session is set up by the SIP server 474 in the ASN 450 among all the RRCs 472, 462, 466, 470 so that the RRC anchor 472 can send the RRM spare capacity request multicast message to all the RRCs 462, 466, and 470 in the respective BS 454, 456, and 458.

Figure 7:
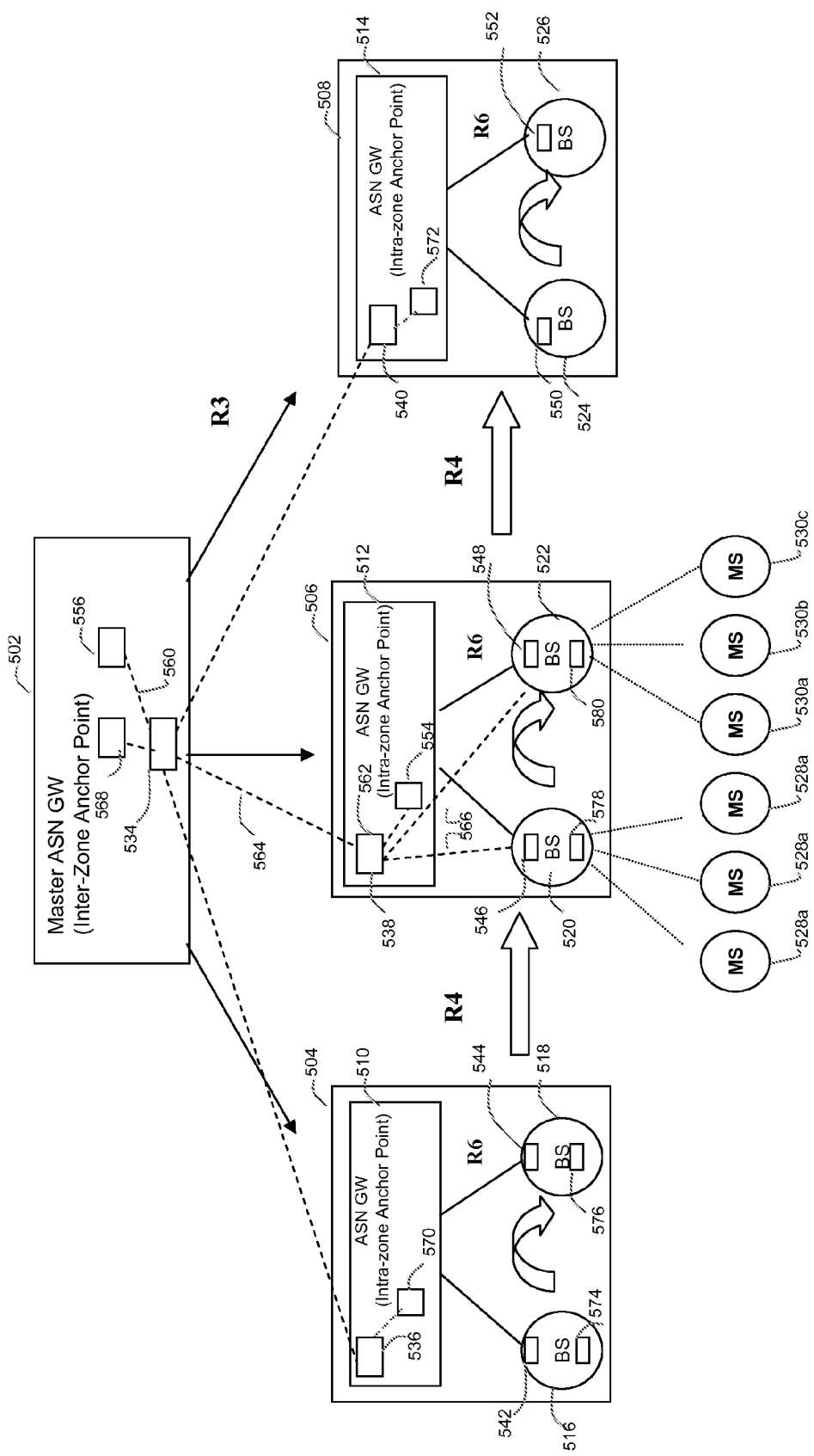
FIG. 7 is a second embodiment of the invention, wherein an MS is paged.

Referring now to FIG. 7, there is shown another WiMAX network example wherein WiMAX control messages are exchanged between FEs via SIP sessions. In this example, data needs to be sent from a home network (not shown) to a sleeping mobile subscriber station. Again, in a WiMAX network, the location of a mobile subscriber station is non-deterministic because the station can move between BS, ASNs, and/or CSNs while asleep. When data arrives for a sleeping MS, WiMAX buffers the data and uses a paging mechanism to discover the location of the sleeping MS.

In FIG. 7 there is shown a master ASN GW 502 coupled via R3 network interfaces to multiple ASNs 504, 506, and 508, each including ASN GW 510, 512, and 514 respectively. The ASN GWs 510, 512, and 514 are peers coupled via R4 network interfaces. Each ASN GW 510, 512, and 514 is coupled via R6 network interfaces to a set of BS. ASN GW 510 is coupled to BS 516, 518. ASN GW 512 is coupled to BS 520, 522. ASN GW is coupled to BS 524, 526. BS 520 is shown coupled to multiple MS 528*a, b, c*. Likewise, BS 522 is shown coupled to multiple MS 530*a, b, c*.

The master ASN GW 502 is shown to include a SIP server 534. The ASN GW 510 includes a SIP server 536. The ASN GW 512 includes a SIP server 538. The ASN GW 540 includes a SIP server 540. Each BS is also shown to include an FE having a SIP agent. Each BS may include more than one FE/SIP agent, one being shown here for clarity of description. The BS 516 includes SIP agent 542. The BS 518 includes SIP agent 544. The BS 520 includes SIP agent 546. The BS 522 includes SIP agent 548. The BS 524 includes SIP agent 550. The BS 526 includes SIP agent 552.

The SIP agents 542 and 544 have registered a URL and IP name with the SIP server 536 in the ASN GW 510. Likewise, the SIP agents 546 and 548 have registered a URL and IP name with the SIP server 538 in the ASN GW 512, and the SIP agents 550 and 552 have registered a URL and IP name with the SIP server 540 in the ASN GW 514. In turn, each ASN SIP server 510, 512, and 514 has registered its URL and IP name with the SIP server 534 in the Anchor ASN 502. SIP sessions can now be set up and torn down between any client server pair in order that WiMAX control messages can be passed between FEs.

In FIG. 7, there is also shown DP/FA controller 568 and anchor PC/LR controller in Master ASN GW 502; PC controller 570, 554 and 572 in ASN 510, ASN 512, and ASN 514; and PC agents 574, 576, 578 and 580 in BS 516, 518, 520 and 522. In FIG. 7, DP/FA controller 568 is for payload data management and forwarding, and all PC controllers and agents are for paging management.

Figure 8:
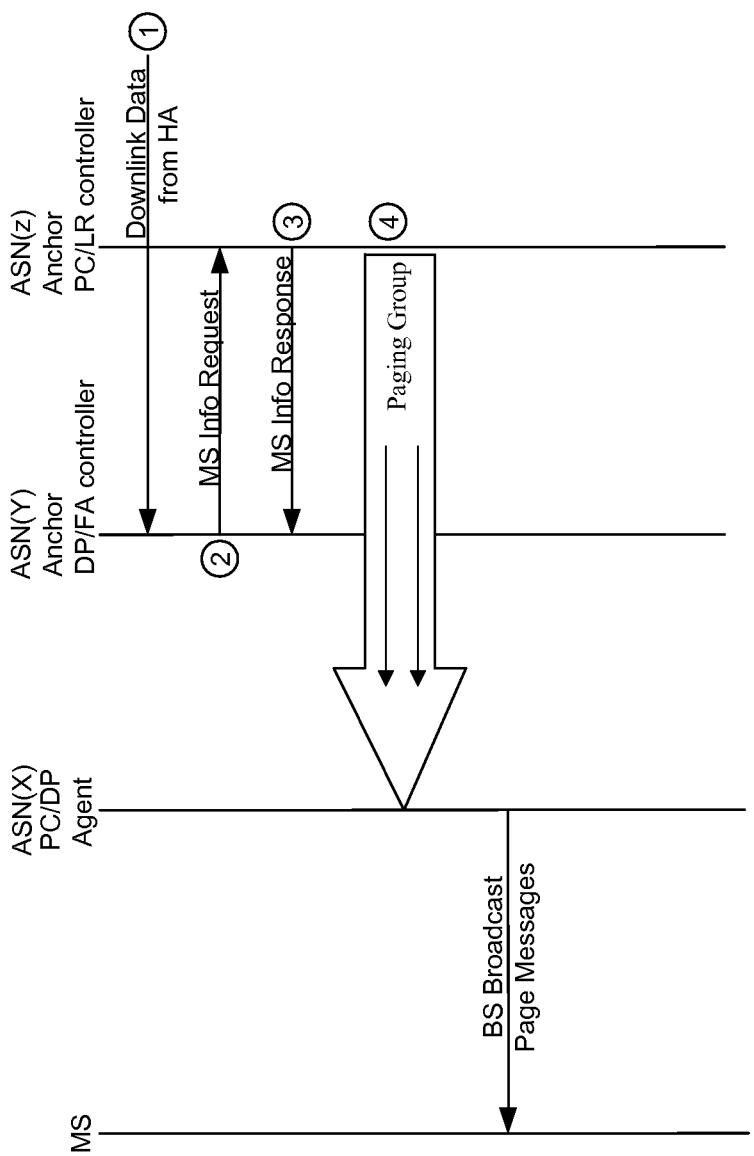
FIG. 8 is a working flow diagram of the embodiment of FIG. 7.

Now, referring to FIGS. 8 and 7, the WiMAX control message flow is shown. Downlink data is received from a home agent (label "1"), destined for the MS 530*b*, while the MS 530*b* is asleep. The anchor datapath FE 568 in the master ASN GW 502 receives and buffers the data, recognizes that the MS 530*b* is in Idle mode, and then sends an MS info request to the Paging controller FE 556 to locate the MS (label "2"). The paging controller FE 556 in the ASN GW 502 confirms the request indicating that the MS is authorized for service (label "3"). Paging controller 556 figures out which paging group the MS 530*b* is in (in this example the paging group may include ASN 504 and ASN 506), and then retrieves the MS paging info (comprising PGID, paging cycle, paging offset, a relay PCID, or a set of BSIDs including the last reported one) and constructs a Paging Announce message. The paging controller FE 556 in the ASN GW 502 then sends a multicast paging message to all the paging controllers in both ASN 504 and ASN 506 based on its knowledge of the topology of the Paging region. For the received paging announce message, in turn, paging controller 570 in ASN GW 510 and paging controller 554 further multicast the message to all the BS (paging agent 574, 576, 578 and 580 at BS 516, 518, 520, 522) in the paging group (label "4"). The MS is then notified by the BS to which it is attached that there is data waiting for it (label "5").

In accordance with the invention, in order for the datapath FE 568 to send the MS info Request to the paging controller FE 556, a SIP session is established between the FEs 554 and 556.

Once the session setup is complete, the MS info Request message is relayed via TCP/UDP accordance with the invention from the data path FE 568 to the paging controller FE 556 in the master ASN GW 502 (FIG. 8 label "2" and label "3") indicating which paging group the MS is in and if the MS is authorized.

As well, to enable master anchorPC controller 556 to send multicasting paging announcement messages to all the PC agents in the paging group, multi-party sessions need to be established from master anchor PC controller to all relay PC controllers such as PC FE 570 and PC FE 554. In turn, PC FE 570 and 554 will also need to establish the multi-party session to all the PC agents in each BS.

In order for the Paging controller FE 556 in the ASN GW 502 to send the multicast paging announcement message to all BS included in the paging group that includes the MS, a multi-party SIP session is established among the master paging controller 556 and relay PC controllers 570 and 554 via SIP server 534, 536 and 538. In turn, PC FE 570 and 554 will also need to establish the multi-party session to all the PC agents in each sub-paging-group such as 574, 576, 578 and 580 in the BS 516, 518, 520 and 522 via SIP server 536 and 538, respectively (FIG. 7 564 and FIG. 7 566).

After all the sessions are established (if they did not exist before), the paging controller FE 556 in the ASN GW 502 can then send a multicast TCP paging message to all the SIP agents (546, 548) in the paging group (label "4"). The BS 522 to which the targeted MS is attached can then broadcast page messages to its attached MS 530*a, b, c*.

The present invention is not to be limited in scope by the specific embodiments described herein. Various modifications of the present invention, in addition to those described herein, will be apparent to those of ordinary skill in the art from the foregoing description and accompanying drawings. One skilled in the art will understand that many specific implementations can be employed to achieve the logical functionality of the invention. All such modifications are intended to fall within the scope of the invention. Software maybe embodied on any known non-transitory computer readable medium having embodied therein a computer program for storing data. In the to context of this document, a computer readable medium may be any tangible medium that can contain, or store a program for use by, or in connection with, an instruction execution system, apparatus, or device. A computer readable medium may be, for example, an electronic magnetic, optical electromagnetic, infrared, or semiconductor system, apparatus or device, or any suitable combination of the foregoing. More specific examples of the computer readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

What is claimed is:

1. A broadband network access system comprising:
a first base station, the first base station associated with a first Session Initiated Protocol (SIP) agent of the broadband network access system;
a second base station, the second base station associated with a second SIP agent of the broadband network access system; and
at least one processor associated with the first and second base stations, the at least one processor configured to be operable to:
establish a SIP session between the first and second SIP agents such that at least one broadband network access system control message is exchanged over the established session to transfer at least one subscriber station function from a first Functional Entity (FE) associated with the first SIP agent to a second FE associated with the second SIP agent.

2. The broadband network access system of claim 1, wherein the first and second SIP agents are each associated with an application program interface (API) wherein the SIP session employs the APIs in each of the SIP agents to establish the SIP session, and wherein exchange of at least one broadband network access system control message employs the APIs in each of the SIP agents to transfer at least one subscriber station function from the first FE to the second FE.

3. The broadband network access system of claim 2, wherein the subscriber station is a mobile subscriber station.

4. The broadband network access system of claim 2, wherein the first and second base stations are in the same access service network.

5. The broadband network access system of claim 2, wherein the first base station is in a first access service network and the second base station is in a second access service network, and wherein the first access service network and the second access service network are different.

6. The broadband network access system of claim 2, wherein the first and second FEs are radio resource controllers.

7. The broadband network access system of claim 2, wherein the first and second FEs are handover controllers.

8. The broadband network access system of claim 2, wherein the first and second FEs are paging controllers.

9. The broadband network access system of claim 2, wherein the first and second FEs are context exchange controllers.

10. The broadband network access system of claim 2, wherein the first and second FEs are security controllers.

11. The broadband network access system of claim 2, wherein the first and second FEs are service flow and data forwarding controllers.

12. The broadband network access system of claim 2, wherein the SIP session comprises a point-to-point SIP session between the first and second SIP agents, and wherein exchange of at least one broadband network access system control message over the established session to transfer at least one subscriber station function from the first FE to the second FE exchanges at least one control message over a session established in the same access service network.

13. The broadband network access system of claim 2, wherein the SIP session comprises a point-to-point SIP session between first and second SIP agents, and wherein exchange of at least one broadband network access system control message over the established session to transfer at least one subscriber station function from the first FE to the second FE exchanges at least one control message over a session in at least two access service networks.

14. The broadband network access system of claim 2, wherein the SIP session between first and second SIP agents comprises a multiparty SIP session between an access service network and a group of FEs including the second FE.

15. The broadband network access system of claim 14, wherein exchange of broadband network access system control messages over the established session to transfer the subscriber station function from the first FE to the second FE exchanges at least one control message over a session established between the first FE in a first access service network and exchanges at least one multicast control message over a multiparty SIP session between a second access service network and a group of FEs including the second FE.

16. A non-transitory computer readable medium having embodied therein a computer program for storing data, wherein the computer program is executable to:
associate a first base station with a first Session Initiated Protocol (SIP) agent of a broadband network access system, wherein the first SIP agent is associated with a first Functional Entity (FE);
associate a second base station with a second SIP agent of the broadband network access system; and
transfer at least one subscriber station function controlled by the first FE to a second FE, the transfer comprising:
establishing a SIP session with the first and second SIP agents; and
exchanging broadband network access system control messages over the established SIP session to transfer the subscriber station function from the first FE to the second FE.

17. A method, comprising:
requesting, by a base station, a Session Initiated Protocol (SIP) session, wherein the base station is associated with a first SIP agent of a broadband network access system;
establishing, by a computer system, a SIP session between the first SIP agent and a second SIP agent;
receiving, by another base station, over the established SIP session at least one broadband network access system control message; and
transferring at least one subscriber station function controlled by a first Functional Entity (FE) associated with the first SIP agent to a second FE, wherein the second FE is associated with the second SIP agent, and wherein the first FE controls at least one subscriber station function.

18. The method of claim 17, wherein each SIP agent is associated with an API; wherein the establishing the SIP session employs the APIs in each of the SIP agents; and wherein exchanging at least one broadband network access system control message employs the APIs in each of the SIP agents to transfer at least one subscriber station function from the first FE to the second FE.

19. The method of claim 17, wherein the subscriber station function is associated with a mobile subscriber station.

20. The method of claim 17, wherein the first and second base stations are in different access service networks.

21. The method of claim 17, wherein exchanging at least one broadband network access system control message over the established session to transfer a subscriber station function from the first FE to the second FE comprises exchanging at least one control message over a session established between the first SIP agent and the second SIP agent in the same access service network.

22. The method of claim 17, wherein exchanging at least one broadband network access system control message over the established session to transfer a subscriber station function from the first FE to the second FE comprises exchanging at least one control message over a session established between the first SIP agent in a first access service network and the second SIP agent in a second access service network.

23. The method of claim 17, wherein the establishing the SIP session between a first SIP agent and a second SIP agent comprises establishing a multiparty SIP session between a group of SIP agent including the second SIP agent.

24. The method of claim 17, wherein exchanging at least one broadband network access system control message over the established session to transfer the function from the first FE to the second FE comprises exchanging at least one control message over a session established between the first FE in a first access service network and exchanges at least one multicast control message over a multiparty SIP session between a second access service network and a group of FEs including the second FE.

* * * * *

UNITED STATES PATENT AND TRADEMARK OFFICE
CERTIFICATE OF CORRECTION

| | | |
|---|---|---|
| PATENT NO. | : 8,761,122 B2 | Page 1 of 1 |
| APPLICATION NO. | : 13/666086 | |
| DATED | : June 24, 2014 | |
| INVENTOR(S) | : Wang | |

It is certified that error appears in the above-identified patent and that said Letters Patent is hereby corrected as shown below:

On the title page Item [71] Applicant: delete "Apple,Inc." and insert -- Apple Inc. --

Signed and Sealed this
Seventh Day of October, 2014

Michelle K. Lee
*Deputy Director of the United States Patent and Trademark Office*